United States Patent
Wu et al.

(10) Patent No.: US 12,528,462 B2
(45) Date of Patent: Jan. 20, 2026

(54) DEVICE AND METHOD FOR STEERING VEHICLE

(71) Applicant: Industrial Technology Research Institute, Hsinchu (TW)

(72) Inventors: Jheng-Rong Wu, Changhua County (TW); Chiung-Hung Chen, New Taipei (TW); Hong-Xian Tsai, Hsinchu (TW); Pei-Jung Liang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 147 days.

(21) Appl. No.: 18/403,736

(22) Filed: Jan. 4, 2024

(65) Prior Publication Data

US 2025/0136105 A1     May 1, 2025

(30) Foreign Application Priority Data

Nov. 1, 2023 (TW) .................................. 112141909

(51) Int. Cl.
*B60W 30/12*     (2020.01)
*B60W 10/20*     (2006.01)
(Continued)

(52) U.S. Cl.
CPC ............ *B60W 30/12* (2013.01); *B60W 10/20* (2013.01); *B60W 50/00* (2013.01); *G06F 17/17* (2013.01);
(Continued)

(58) Field of Classification Search
CPC ...... B60W 30/12; B60W 10/20; B60W 50/00; B60W 2050/0011; B60W 2420/403;
(Continued)

(56) References Cited

U.S. PATENT DOCUMENTS 10,933,883 B2    3/2021    Lee et al.
11,453,240 B2    9/2022    Jung
(Continued)

FOREIGN PATENT DOCUMENTS

CN     102303605     1/2012
CN     106132755     11/2016
(Continued)

OTHER PUBLICATIONS

"Office Action of Japan Counterpart Application", issued on Mar. 25, 2025, p. 1-p. 2.
(Continued)

*Primary Examiner* — Yi-Kai Wang
(74) *Attorney, Agent, or Firm* — JCIPRNET (57) ABSTRACT

A device and a method for steering a vehicle are provided. The method includes following steps: obtaining a point cloud data of a vehicle through a lidar, obtaining an RGB image of the vehicle through a camera, and obtaining a current speed of the vehicle through a wheel speed sensor; using the current speed and local path way points associated with the point cloud data to obtain a target angle; using the current speed and a central lane distance error associated with the RGB image to obtain a compensator angle; and using the target angle and the compensator angle to obtain a steering command, and steering the vehicle to drive in a lane according to the steering command.

18 Claims, 10 Drawing Sheets

(51) Int. Cl.
*B60W 50/00* (2006.01)
*G06F 17/17* (2006.01)

(52) U.S. Cl.
CPC ............... *B60W 2050/0011* (2013.01); *B60W 2420/403* (2013.01); *B60W 2420/408* (2024.01); *B60W 2420/503* (2013.01); *B60W 2520/10* (2013.01); *B60W 2552/53* (2020.02); *B60W 2556/40* (2020.02)

(58) Field of Classification Search
CPC ..... B60W 2420/408; B60W 2420/503; B60W 2520/10; B60W 2552/53; B60W 2556/40; G06F 17/17
USPC .......................................................... 701/41
See application file for complete search history.

(56) References Cited

U.S. PATENT DOCUMENTS

| | | | |
|---|---|---|---|
| 2009/0284360 | A1 | 11/2009 | Litkouhi |
| 2010/0211271 | A1 | 8/2010 | Yasutake et al. |
| 2021/0155287 | A1 | 5/2021 | Jung |
| 2022/0001890 | A1* | 1/2022 | Babar .................. B62D 15/025 |
| 2024/0262416 | A1* | 8/2024 | Saito .................... B60W 30/12 |
| 2024/0310526 | A1* | 9/2024 | Van Wiemeersch ... G06V 20/59 |

FOREIGN PATENT DOCUMENTS

| | | |
|---|---|---|
| CN | 109927721 | 6/2019 |
| CN | 111291676 | 6/2020 |
| CN | 111950467 | 11/2020 |
| CN | 112441001 | 3/2021 |
| CN | 113942503 | 1/2022 |
| CN | 114516324 | 5/2022 |
| CN | 116461609 | 7/2023 |
| JP | 2012507088 | 3/2012 |
| JP | 2017067727 | 4/2017 |
| JP | 2018062244 | 4/2018 |
| JP | 2019100970 | 6/2019 |
| JP | 2021514885 | 6/2021 |
| JP | 2023142085 | 10/2023 |
| TW | 201821920 | 6/2018 |

OTHER PUBLICATIONS

Jongin Son et al., "Real-time illumination invariant lane detection for lane departure warning system", Expert Systems with Applications, vol. 42, Issue 4, Mar. 2015, pp. 1816-1824.

Lizhe Liu et al., "CondLaneNet: a Top-to-down Lane Detection Framework Based on Conditional Convolution", Proceedings of the IEEE/CVF International Conference on Computer Vision (ICCV), Feb. 10, 2023, pp. 3773-3782.

Davy Neven et al., "Towards End-to-End Lane Detection: an Instance Segmentation Approach", 2018 IEEE Intelligent Vehicles Symposium (IV), Feb. 15, 2018, pp. 1-7.

Abdulhakam.AM.Assidiq et al., "Real Time Lane Detection for Autonomous Vehicles", Proceedings of the International Conference on Computer and Communication Engineering 2008, May 13-15, 2008, pp. 82-88.

Lucas Tabelini et al., "Keep your Eyes on the Lane: Real-time Attention-guided Lane Detection", 2021 IEEE/CVF Conference on Computer Vision and Pattern Recognition (CVPR), Nov. 18, 2020, pp. 1-9.

Jingchao Yang et al., "A Survey of SLAM Research based on LiDAR Sensors", International Journal of Sensors, vol. 1, Issue 1, Jul. 22, 2019, pp. 1-8.

Senthil Velmurugan Palanisamy, "A survey on VSLAM and Visual odometry for Robotics", 2020, pp. 1-55. Available at: https://api.semanticscholar.org/CorpusID:231645882.

"Office Action of Taiwan Counterpart Application", issued on Aug. 15, 2024, p. 1-p. 6.

* cited by examiner

```
IF ( VehicleSpeed > MinSpeedLimit && EnableLaneKeeping )
 | IntegralVal = IntegralVal + Δd * IntegralFactor / VehicleSpeed
Else
 | IntegralVal = IntegralVal * ∂
end
CompensatorAngle = IntegralVal
```

DEVICE AND METHOD FOR STEERING VEHICLE

CROSS-REFERENCE TO RELATED APPLICATION

This application claims the priority benefit of Taiwanese application no. 112141909, filed on Nov. 1, 2023. The entirety of the above-mentioned patent application is hereby incorporated by reference herein and made a part of this specification.

TECHNICAL FIELD

The disclosure relates to a device and a method for steering vehicle.

BACKGROUND

At present, technologies for controlling vehicles (such as unmanned vehicles) have been continuously developed. However, the existing technologies are often easily affected by weather and complex lane conditions, resulting in poor vehicle control.

SUMMARY

The disclosure is directed to a device and a method for steering vehicle, which are adapted to steer a vehicle to keep the vehicle stably in a center of a lane.

The disclosure provides a device for steering a vehicle, which includes a LiDAR, a camera, a wheel speed sensor, and a processor. The processor is coupled to the LiDAR, the camera, and the wheel speed sensor, where the processor obtains a point cloud data of the vehicle through the LiDAR, obtains an RGB image of the vehicle through the camera, and obtains a current speed of the vehicle through the wheel speed sensor. The processor uses the current speed and local path way points associated with the point cloud data to obtain a target angle. The processor uses the current speed and a central lane distance error associated with the RGB image to obtain a compensator angle. The processor uses the target angle and the compensator angle to obtain a steering command of the vehicle, and steers the vehicle to drive in a lane according to the steering command.

The disclosure provides a method for steering a vehicle including the following. A point cloud data of the vehicle is obtained through a LiDAR. An RGB image of the vehicle is obtained through a camera. A current speed of the vehicle is obtained through a wheel speed sensor. The current speed and local path way points associated with the point cloud data are used to obtain a target angle. The current speed and a central lane distance error associated with the RGB image are used to obtain a compensator angle. The target angle and the compensator angle are used to obtain a steering command of the vehicle. The vehicle is steered to drive in a lane according to the steering command.

Based on the above description, the device and method for steering a vehicle of the disclosure may use the information obtained by the LiDAR, camera, and wheel speed sensor to obtain the target angle and the compensator angle, and then obtain the steering command to steer the vehicle to drive in the lane. In this way, the vehicle may be steered and kept stable in the center of the lane, thereby reducing the risk of accidents.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
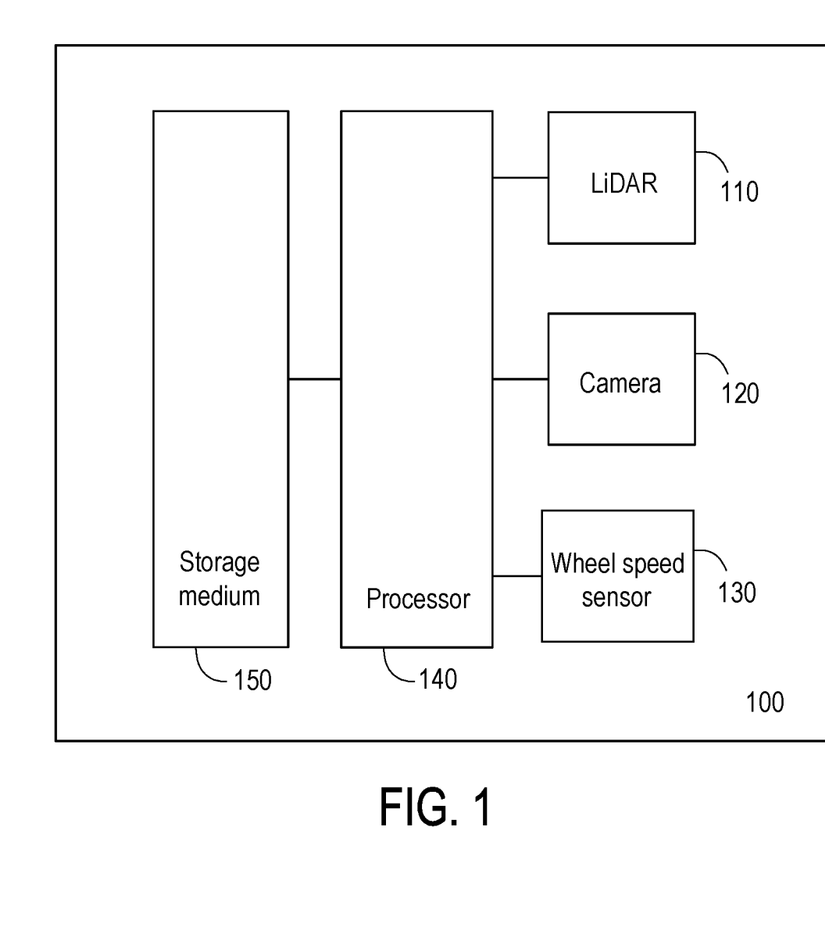
FIG. 1 is a schematic diagram of a device for steering a vehicle according to an embodiment of the disclosure.

FIG. 1 is a schematic diagram of a device 100 for steering a vehicle according to an embodiment of the disclosure. Referring to FIG. 1, the device 100 may include a LiDAR 110, a camera 120, a wheel speed sensor 130 and a processor 140. The processor 140 is coupled to the LiDAR 110, the camera 120 and the wheel speed sensor 130. In other embodiments, the device 100 may further include a storage medium 150 coupled to the processor 140. The device 100 may be installed in a vehicle (not shown).

The processor 140 may include a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or other similar components or a combination of the above components. The processor 140 may access and execute multiple modules and various applications stored in the storage medium 150.

The storage medium 150 may include any type of fixed or removable random access memory (RAM), read-only memory (ROM), flash memory, hard disk drive (HDD), solid state drive (SSD), or similar components, or a combination of the aforementioned components, and is used for storing multiple modules or various applications that may be executed by the processor 140.

Figure 2:
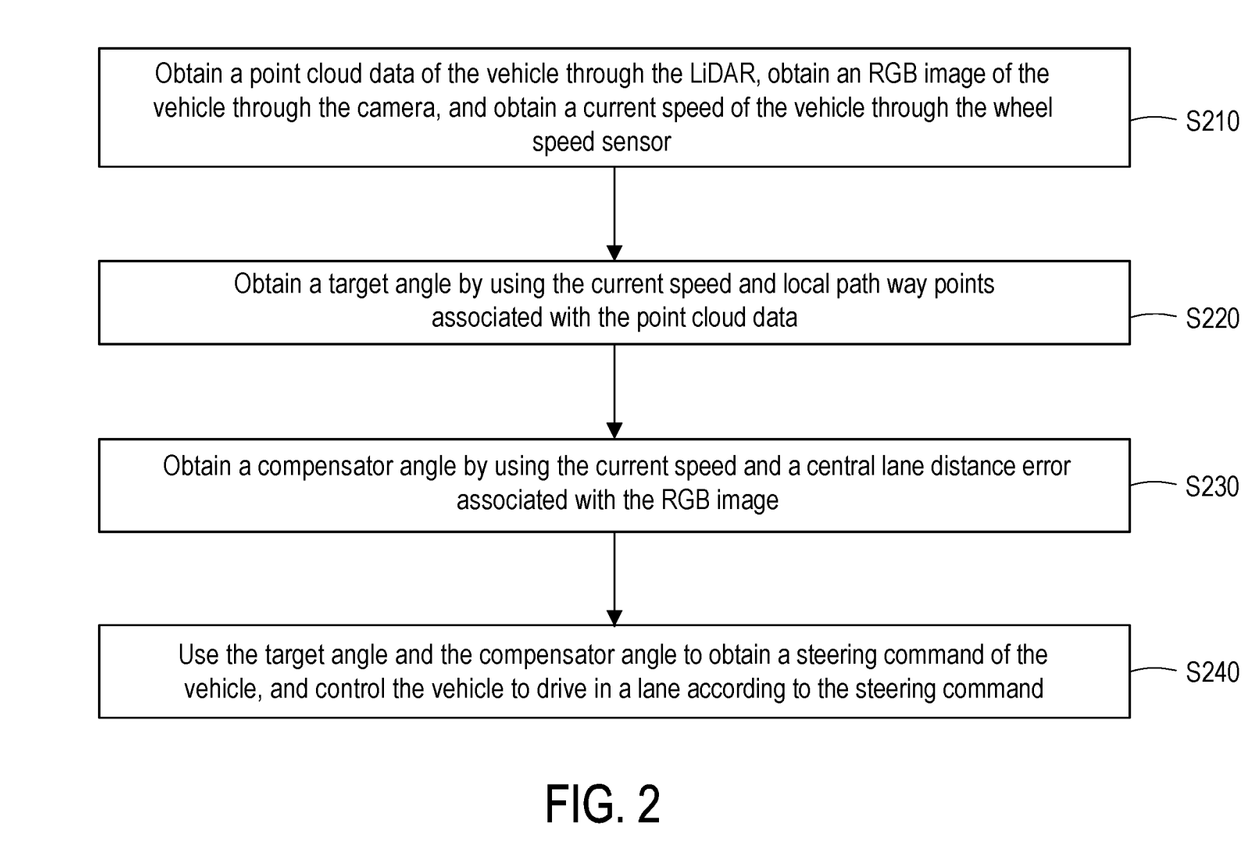
FIG. 2 is a flowchart of a method for steering a vehicle according to an embodiment of the disclosure.
Figure 3:
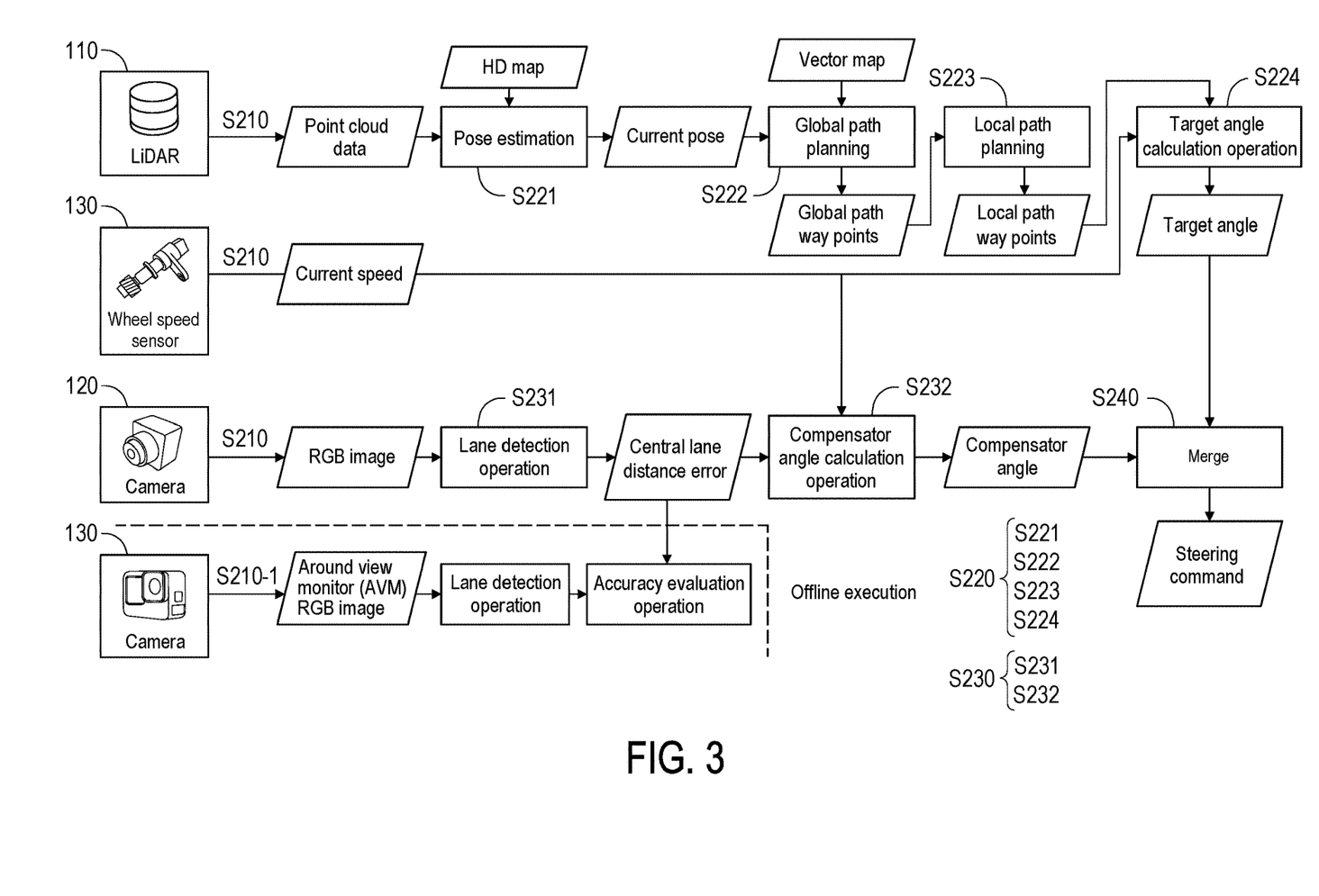
FIG. 3 is a further illustration of FIG. 2.

FIG. 2 is a flowchart of a method for steering a vehicle according to an embodiment of the disclosure. FIG. 3 is a further illustration of FIG. 2. Referring to FIG. 1, FIG. 2 and FIG. 3 at the same time.

In step S210, the processor 140 may obtain a point cloud data of the vehicle through the LiDAR 110, obtain an RGB image of the vehicle through the camera 120, and obtain a current speed of the vehicle through the wheel speed sensor 130.

In step S220, the processor 140 may obtain a target angle by using the current speed and local path way points associated with the point cloud data. In an embodiment, the storage medium 150 may store a high definition (HD) map, a vector map, a start point of the vehicle, and a target point of the vehicle. The HD map is, for example, a point cloud map of a scene. Furthermore, the HD map may be in a PCD format. On the other hand, the vector map may include defining road patterns, lane locations, intersections, and traffic signals/traffic signs. It should be noted here that step S220 in FIG. 2 may include step S221, step S222, step S223 and step S224 in FIG. 3, which are further described below.

Referring to FIG. 3, in step S221, the processor 140 may perform pose estimation on the point cloud data, the HD map, and the start point to obtain a current pose of the vehicle. The current pose may include x-coordinates, y-coordinates and a yaw angle of the vehicle, but the disclosure is not limited thereto. In an embodiment, pose estimation may include Normal Distributions Transform (NDT).

Figure 4:
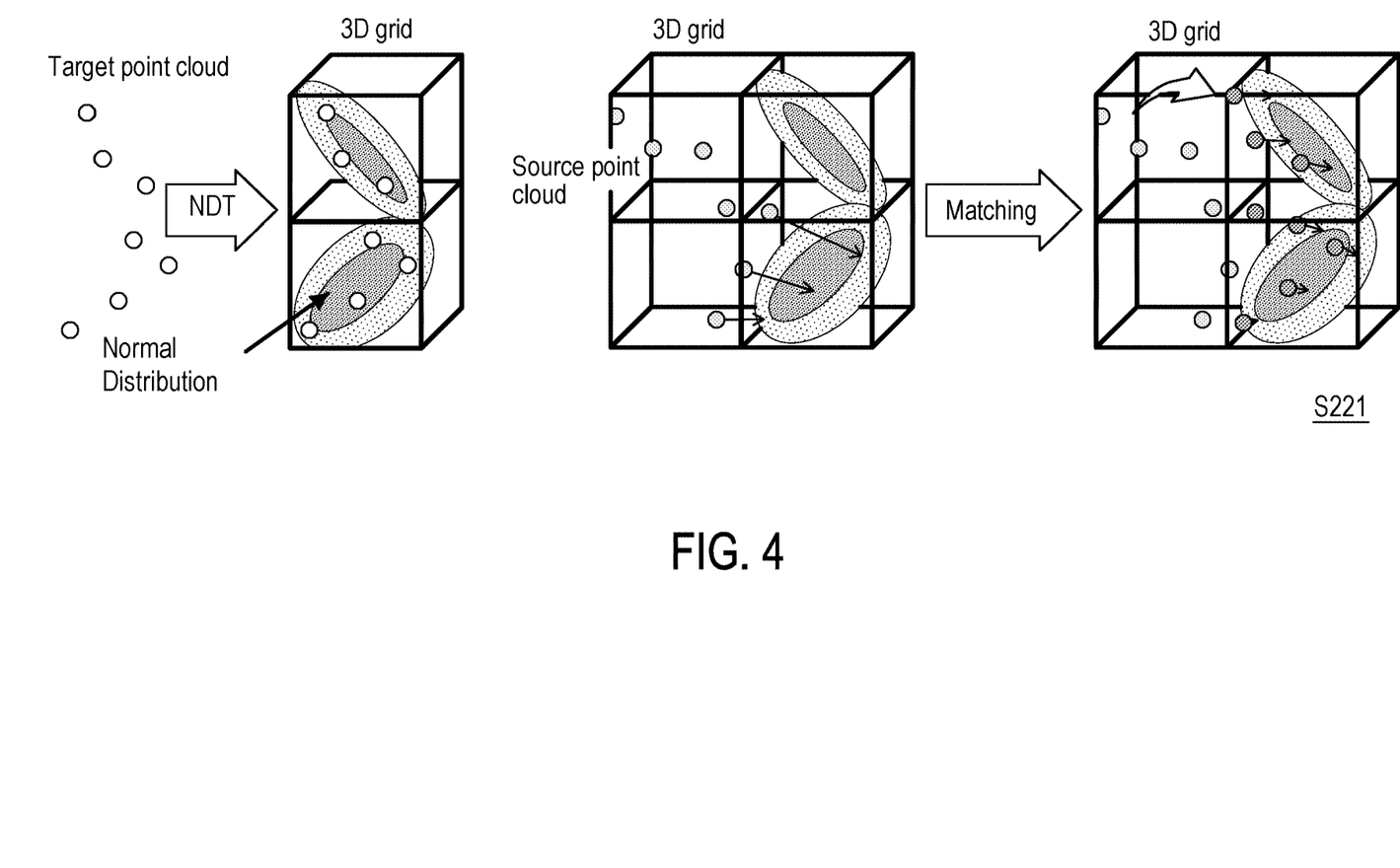
FIG. 4 is a schematic diagram of Normal Distributions Transform according to an embodiment of the disclosure.

FIG. 4 is a schematic diagram of Normal Distributions Transform according to an embodiment of the disclosure. Referring to FIG. 1, FIG. 2, FIG. 3 and FIG. 4 at the same time, in the embodiment, the processor 140 may divide a target point cloud into 3D grids according to a fixed resolution, and may calculate a mean value and a covariance matrix of the target point cloud in each 3D grid. Then, the processor 140 may calculate a probability of distribution of a source point cloud in the target point cloud as a matching relationship. In other words, by matching features between the target point cloud and the source point cloud, the processor 140 may locate a position of the vehicle and detect a movement of the vehicle.

In other embodiments, the above-mentioned pose estimation may also include iterative closest point (ICP), point cloud matching based on deep learning, LiDAR odometry and mapping (LOAM) and fast point feature histograms (FPFH). However, the disclosure is not limited thereto. In detail, the iterative closest point may find the best match between the target point cloud and the source point cloud by minimizing an average distance between the target point cloud and the source point cloud. On the other hand, the point cloud matching based on deep learning may learn features between the point clouds through a deep learning model to achieve more accurate matching.

Referring back to FIG. 3, in step S222, the processor 140 may perform global path planning on the vector map, the current pose, and a target point to obtain global path way points of the vehicle. In an embodiment, the global path planning may include Trajectory Planning. Specifically, the Trajectory Planning may use the current pose and the vector map (including routes and speed limits, etc.) to map the current pose to the corresponding route to find the shortest global path way points. Then, in step S223, the processor 140 may perform local path planning on the current pose and the global path way points to obtain local path way points of the vehicle. In an embodiment, the local path planning may include Roll-Out Generation. In detail, the Roll-Out Generation may move a fixed distance vertically from the global path and perform a fixed number of steps of trajectory sampling at each position, and the most representative trajectory may be selected through a Bayesian optimization strategy to improve effectiveness and accuracy of the local path way points. It should be noted that the Trajectory Planning and the Roll-Out Generation are both Open Planner methods.

Figure 5:
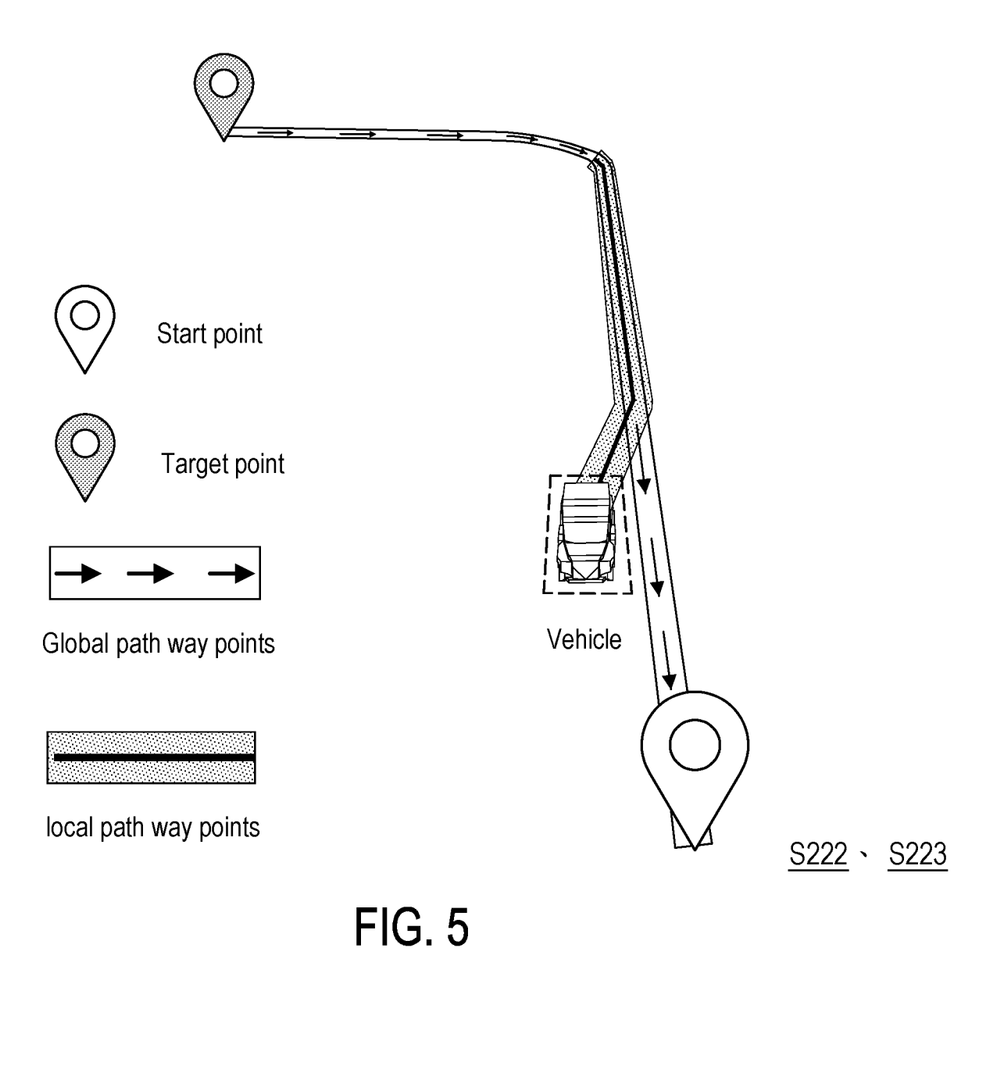
FIG. 5 is a schematic diagram of global path planning and local path planning according to an embodiment of the disclosure.

FIG. 5 is a schematic diagram of global path planning and local path planning according to an embodiment of the disclosure. Referring to FIG. 1, FIG. 2, FIG. 3 and FIG. 5 at the same time, in the embodiment, when the processor 140 performs global path planning, the processor 140 may not consider traffic signals, and may only consider a start point and a target point of the vehicle. On the other hand, when the processor 140 performs local path planning, the processor 140 may consider a current environmental state of the vehicle, including but not limited to a lane in which the vehicle is currently located, whether there are other vehicles in a next lane, and/or whether the traffic signal is currently red light.

In other embodiments, the above-mentioned global path planning may include Mission Planner, Route Planner, A*, D*, machine learning and neural network. On the other hand, the above-mentioned local path planning may include Motion Planner, A*, Dynamic Window Approach (DWA), Rapidly-exploring Random Trees (RRT), Linear Quadratic Regulation (LQR) and Model Predictive Control (MPC), but the disclosure is not limited thereto.

Referring back to FIG. 3, in step S224, the processor 140 may perform a target angle calculation operation on the current speed and the local path way points to obtain the target angle, where the target angle calculation operation may include Pure Pursuit. Specifically, the Pure Pursuit is a path tracking algorithm based on a distance and an angle difference between the vehicle and the target point, thereby calculating a movement direction and speed of the vehicle.

Figure 6:
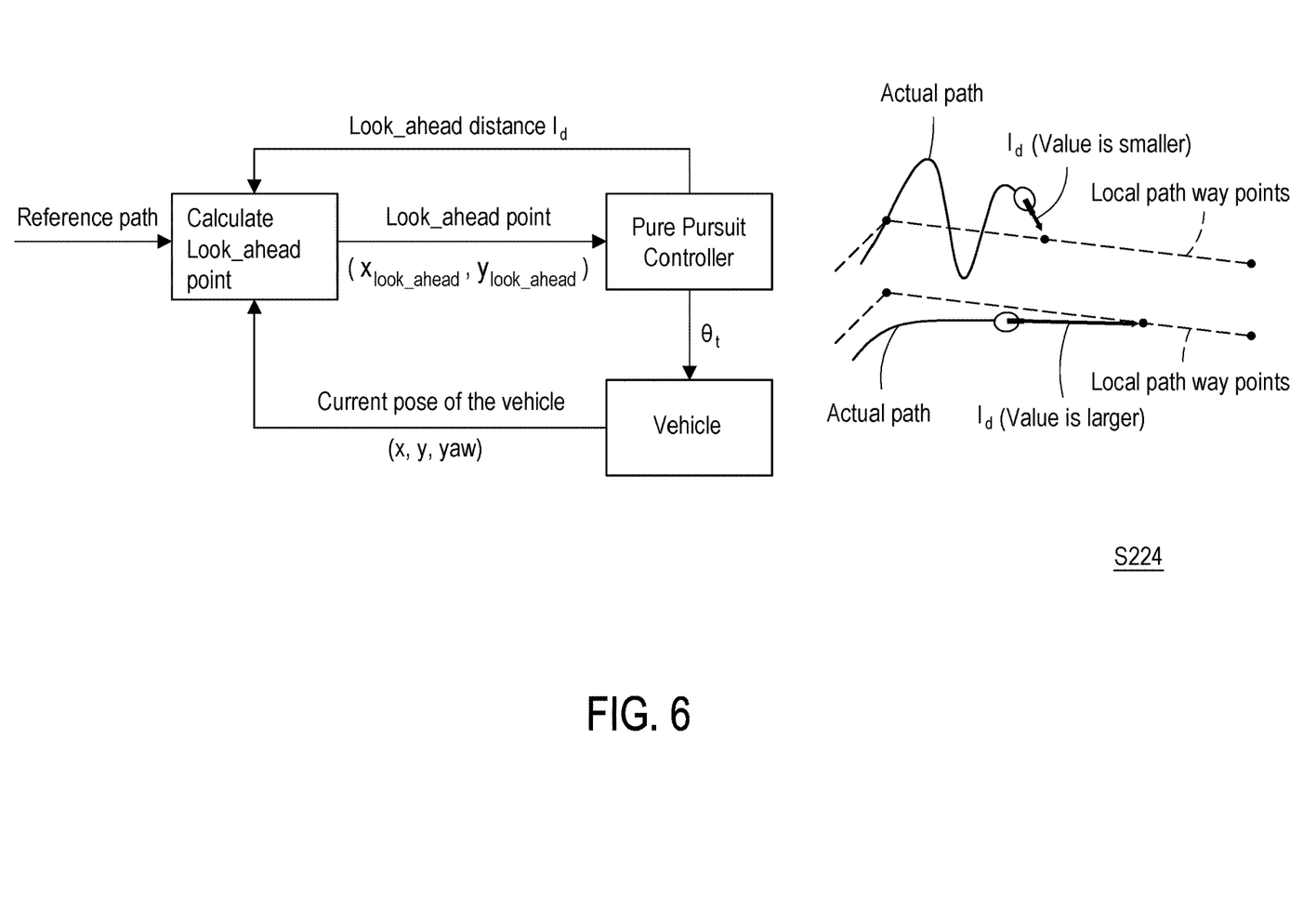
FIG. 6 is a schematic diagram of Pure Pursuit according to an embodiment of the disclosure.

FIG. 6 is a schematic diagram of Pure Pursuit according to an embodiment of the disclosure. Refer to FIG. 1, FIG. 2, FIG. 3 and FIG. 6 at the same time, in the embodiment, if a value of a parameter Look_ahead distance ($l_d$) is set to an excessively large value, the vehicle is likely to encounter a problem of cutting corner. On the other hand, if the parameter Look_ahead distance ($l_d$) is set to a value that is too small, the vehicle is likely to encounter a problem of vibration. After setting the Look_ahead distance to an appropriate value, the processor 140 may obtain the target angle ($\theta_t$) as shown in FIG. 6.

In other embodiments, the above-mentioned target angle calculation operation may also include model predictive control (MPC), fuzzy logic control (FLC), proportional integral derivative control (PID control) and artificial neural network (ANN). However, the disclosure is not limited thereto.

Referring back to FIG. 2, in step S230, the processor 140 may obtain the compensator angle by using the current speed and the central lane distance error associated with the RGB image. It should be noted here that step S230 in FIG. 2 may include step S231 and step S232 in FIG. 3.

Referring back to FIG. 3, in step S231, the processor 140 may perform a lane detection operation on the RGB image to obtain the central lane distance error, where the lane detection operation may include You Only Look Once (YOLO).

Figure 7:
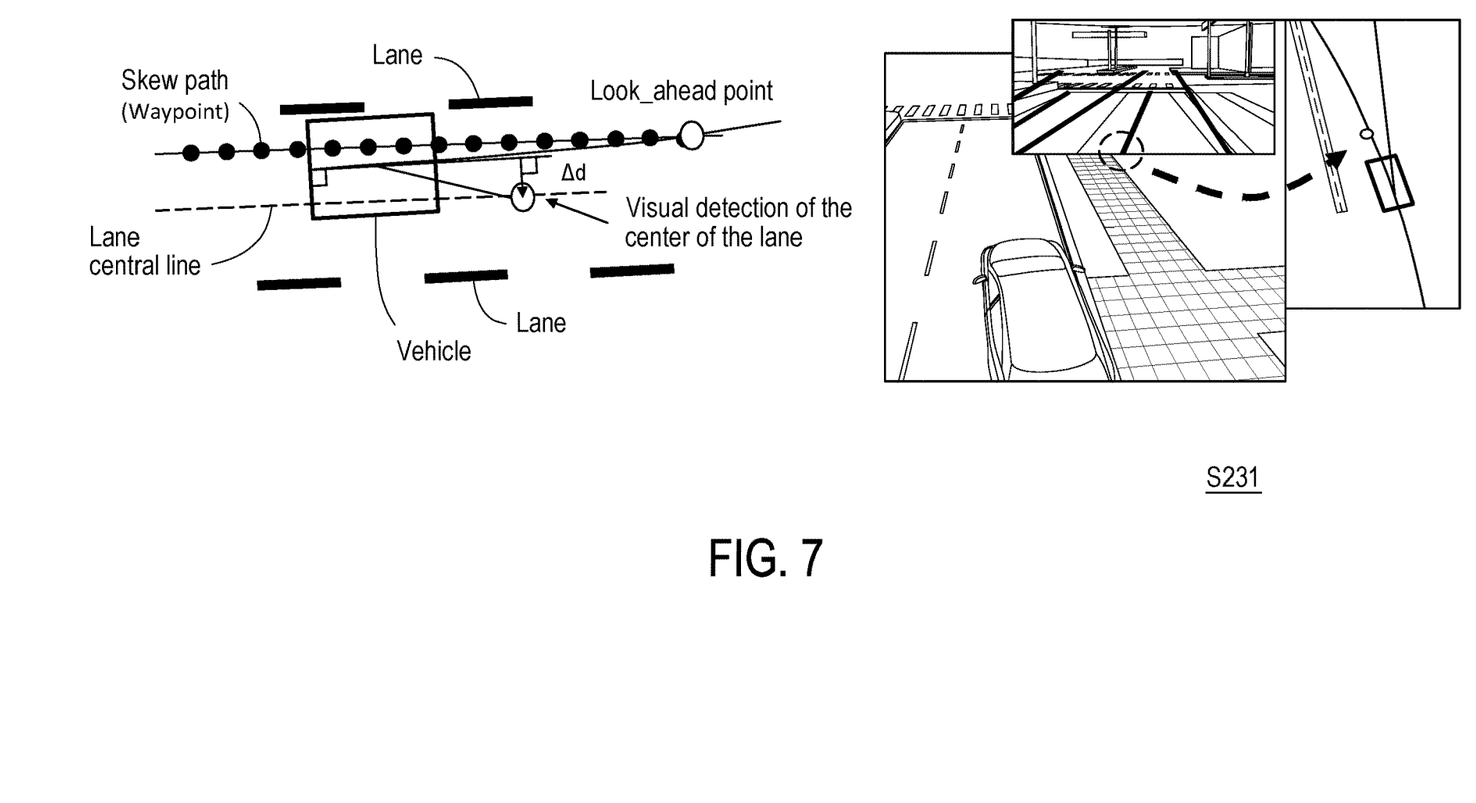
FIG. 7 is a schematic diagram of a lane detection operation according to an embodiment of the disclosure.

FIG. 7 is a schematic diagram of a lane detection operation according to an embodiment of the disclosure. Referring to FIG. 1, FIG. 2, FIG. 3 and FIG. 7 at the same time, in the embodiment, the processor 140 may perform YOLO on the RGB image to detect an object in the RGB image. Then, the processor 140 may frame the object and mark a neural network of this specific object category, and may transform the neural network into a neural network that may achieve multi-task applications. In this way, the processor 140 may perform feature matching on the RGB image to simultaneously perform lane detection and object detection to calculate the central lane distance error (Δd) shown in FIG. 7.

In other embodiments, the above-mentioned lane detection operation may include edge detection and semantic segmentation, but the disclosure is not limited thereto. In detail, the edge detection may be a machine vision algorithm. For example, the processor 140 may use an edge detection algorithm (Canny algorithm) to detect lanes in the RGB image, and then use Hough Transform to convert detected edges into straight lines, thereby identifying the lanes in the RGB image. On the other hand, the semantic segmentation may divide the RGB image into different regions to implement the lane detection operation. The semantic segmentation is, for example, Mask R-CNN and U-Net.

Referring back to FIG. 3, in step S232, the processor 140 may perform a compensator angle calculation operation on the current speed and the central lane distance error to obtain a compensator angle, where the compensator angle calculation operation may include proportional integral derivative control (PID control).

Figure 8:
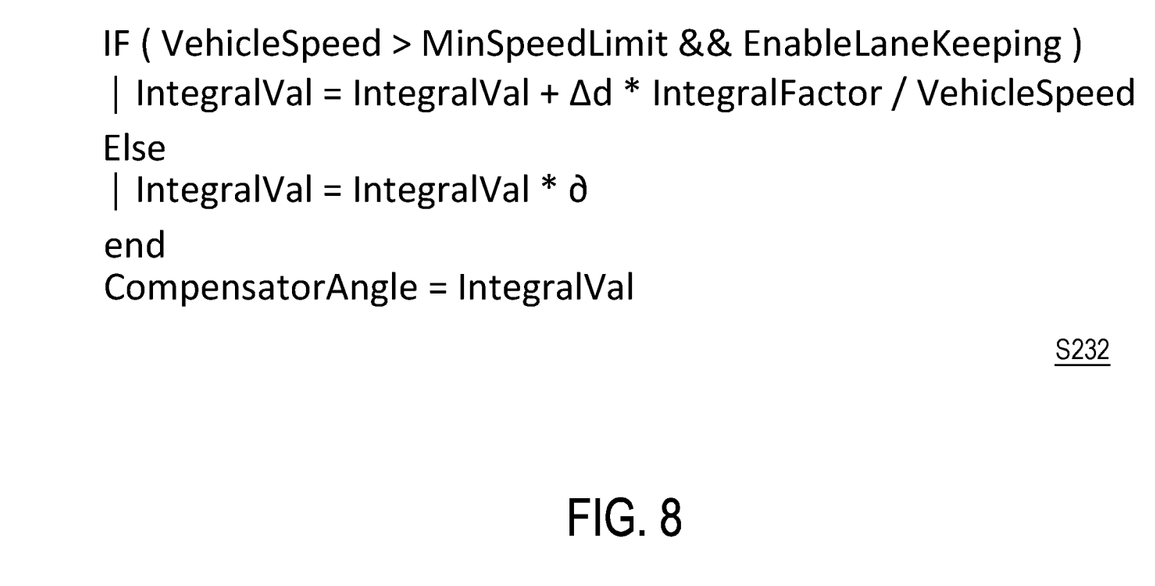
FIG. 8 is a schematic diagram of a compensator angle calculation operation according to an embodiment of the disclosure.

FIG. 8 is a schematic diagram of a compensator angle calculation operation according to an embodiment of the disclosure. Referring to FIG. 1, FIG. 2, FIG. 3 and FIG. 8 at the same time, in the embodiment, the processor 140 may obtain the compensator angle used to resist a deviation path according to the central lane distance error (Δd) and the current speed of the vehicle, thereby correcting positioning inaccuracy caused by environmental changes and other factors. In detail, an angle integrator in the PID controller may be used to adjust the compensator angle of the vehicle. Furthermore, since the vehicle is likely to encounter the problem oscillation when traveling at high speed, the processor 140 may generate a reduction coefficient (ə) according to the current speed of the vehicle to prevent the vehicle from encountering the problem of oscillation when the vehicle is turning. As shown in FIG. 8, when the processor 140 obtains the central lane distance error (Δd), and the current speed of the vehicle (VehicleSpeed) is greater than a speed threshold (MinSpeedLimit), the processor 140 may use the central lane distance error (Δd) to update an angle integral value (IntegralVal). On the other hand, when the processor 140 does not obtain the central lane distance error (Δd), or the current speed of the vehicle is less than the speed threshold, the processor 140 may adjust the angle integral value by using the reduction coefficient (ə). In detail, the reduction coefficient (ə) may be a value less than 1 to slowly return the angle integral value to zero. Finally, the processor 140 may use the angle integral value to obtain the compensator angle ($\theta_c$).

In other embodiments, the compensator angle calculation operation may include model predictive control (MPC), fuzzy logic control (FLC) and artificial neural network (ANN), but the disclosure is not limited thereto.

Referring back to FIG. 2, in step S240, the processor 140 may use the target angle and the compensator angle to obtain a steering command of the vehicle, and may control the vehicle to drive in the lane according to the steering command.

Figure 9:
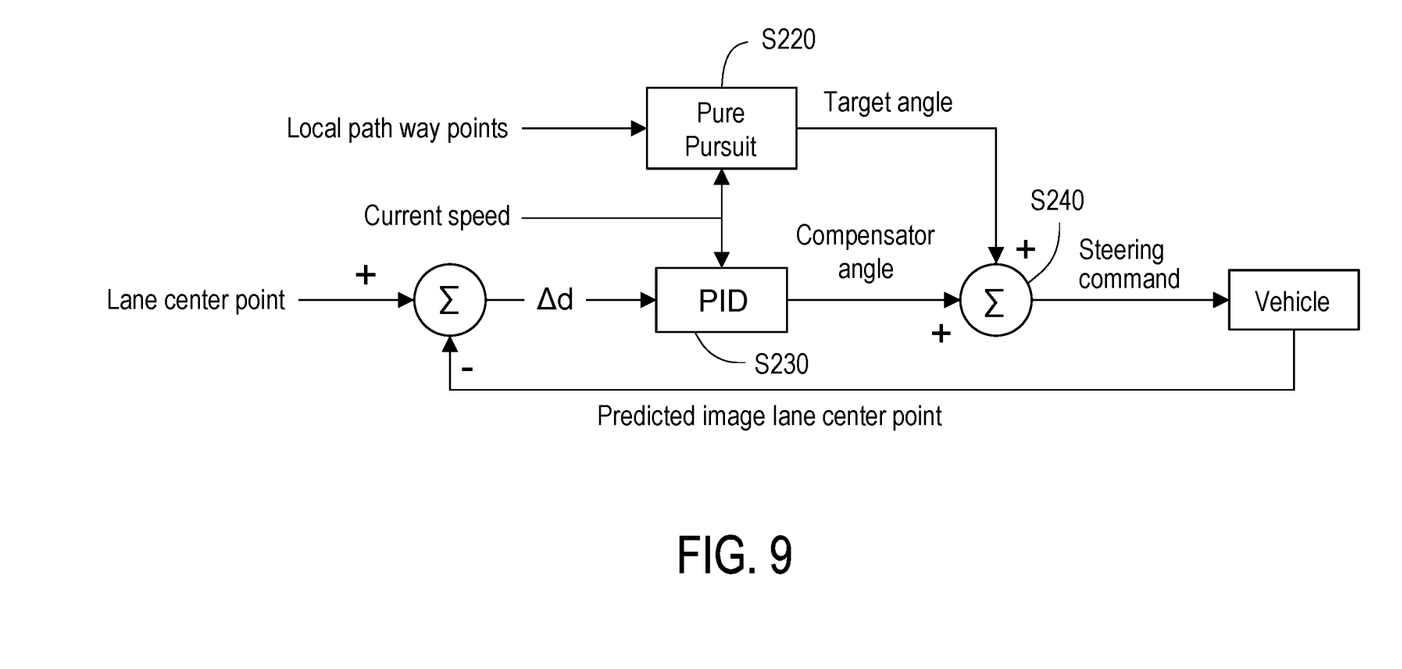
FIG. 9 is a schematic diagram of obtaining a steering command of the vehicle according to an embodiment of the disclosure.

FIG. 9 is a schematic diagram of obtaining a steering command of the vehicle according to an embodiment of the disclosure. Refer to FIG. 1, FIG. 2, FIG. 3 and FIG. 9 at the same time, in the embodiment, the processor 140 may merge the target angle and the compensator angle, thereby improving accuracy of lane keeping and accuracy of motion control. In detail, a Pure Pursuit controller may control an instantaneous deviation of the vehicle but cannot solve a steady-state error of the vehicle. Therefore, the processor 140 may use the angle integrator in the PID controller to correct the steady-state error of the vehicle. In this way, the device 100 of the disclosure may solve the problems of instantaneous deviation and steady-state error at the same time. Furthermore, in the embodiment, the steering command may include a speed steering command and an angular steering command.

In other embodiments, in order to evaluate the accuracy of the device 100 in steering the vehicle, the processor 140 may perform an accuracy evaluation operation offline, which is described below.

Figure 10:
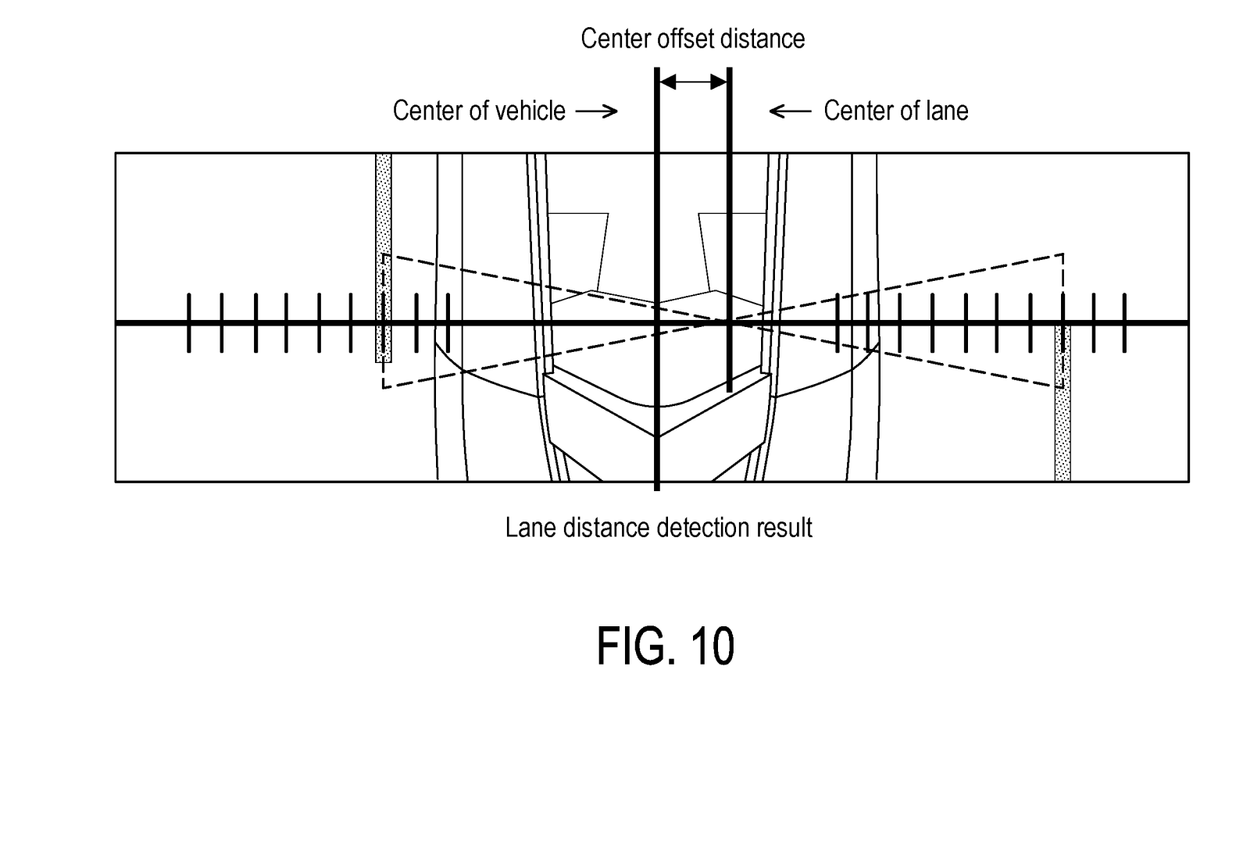
FIG. 10 is a schematic diagram illustrating execution of an accuracy evaluation operation according to an embodiment of the disclosure.

FIG. 10 is a schematic diagram illustrating execution of an accuracy evaluation operation according to an embodiment of the disclosure. Referring to FIG. 1, FIG. 3 and FIG. 10 at the same time, in step S210-1, the processor 140 may obtain an around view monitor (AVM) RGB image of the vehicle through the camera 120. Then, the processor 140 may use the AVM RGB image to perform an accuracy evaluation operation. In an embodiment, the accuracy evaluation operation may include an accuracy root mean square error (RMSE) evaluation operation. In detail, the processor 140 may perform image spatial scale correction, edge detection and Hough transform on the AVM RGB image to extract lanes in the AVM RGB image. In this way, the processor 140 may obtain the accuracy of steering the vehicle (i.e., a distance between a vehicle center and a lane center). Furthermore, the processor 140 may obtain the accuracy of each point on the path of the vehicle to calculate an overall accuracy of steering the vehicle by using the root mean square error. Equation 1 is an example.

$$e_{rms} = \sqrt{\frac{\sum_{i=1}^{N} e_i^2}{N}} = \sqrt{\frac{e_1^2 + e_2^2 + \cdots + e_N^2}{N}} \quad \text{(equation 1)}$$

Where $e_{rms}$ is the overall accuracy of steering the vehicle, $e_1$ is the accuracy of a $1^{st}$ point on the path of the vehicle, $e_2$ is the accuracy of a $2^{nd}$ point on the path of the vehicle, ... until $e_N$ is the accuracy of an $N^{th}$ point on the path of the vehicle.

In summary, the device and method for steering a vehicle of the disclosure may use the information obtained by the LiDAR, camera and wheel speed sensor to obtain the target angle and the compensator angle, and then obtain the steering command to steer the vehicle to drive in the lane. In this way, the vehicle may be steered and kept stable in the center of the lane, thereby reducing the risk of accidents.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A device for steering a vehicle, comprising:
a LiDAR;
a camera;
a wheel speed sensor; and
a processor, coupled to the LiDAR, the camera, and the wheel speed sensor, wherein
the processor obtains a point cloud data of the vehicle through the LiDAR, obtains an RGB image of the vehicle through the camera, and obtains a current speed of the vehicle through the wheel speed sensor,
the processor uses the current speed and local path way points associated with the point cloud data to obtain a target angle,
the processor uses the current speed and a central lane distance error associated with the RGB image to obtain a compensator angle,
the processor uses the target angle and the compensator angle to obtain a steering command of the vehicle, and steers the vehicle to drive in a lane according to the steering command, wherein
the processor performs a compensator angle calculation operation on the current speed and the central lane distance error to obtain the compensator angle, wherein the compensator angle calculation operation comprises proportional integral derivative control (PID control).

2. The device for steering the vehicle according to claim 1, further comprising a storage medium coupled to the processor, wherein the storage medium stores an HD map, a vector map, a start point of the vehicle, and a target point of the vehicle, wherein
the processor performs pose estimation on the point cloud data, the HD map, and the start point to obtain a current pose of the vehicle;
the processor performs global path planning on the vector map, the current pose, and the target point to obtain global path way points of the vehicle;
the processor performs local path planning on the current pose and the global path way points to obtain the local path way points of the vehicle.

3. The device for steering the vehicle according to claim 2, wherein the pose estimation comprises Normal Distributions Transform (NDT).

4. The device for steering the vehicle according to claim 2, wherein the global path planning comprises Trajectory Planning.

5. The device for steering the vehicle according to claim 2, wherein the local path planning comprises Roll-Out Generation.

6. The device for steering the vehicle according to claim 1, wherein
the processor performs a target angle calculation operation on the current speed and the local path way points to obtain the target angle, wherein the target angle calculation operation comprises Pure Pursuit.

7. The device for steering the vehicle according to claim 1, wherein
the processor performs a lane detection operation on the RGB image to obtain the central lane distance error, wherein the lane detection operation comprises You Only Look Once (YOLO).

8. The device for steering the vehicle according to claim 1, wherein
the processor obtains an Around View Monitor (AVM) RGB image of the vehicle through the camera, and
the processor uses the AVM RGB image to perform an accuracy evaluation operation.

9. The device for steering the vehicle according to claim 8, wherein the accuracy evaluation operation comprises an accuracy root mean square error (RMSE) evaluation operation.

10. A method for steering a vehicle, adapted to a device comprising a LiDAR, a camera, and a wheel speed sensor, and the method for steering the vehicle comprising:
obtaining a point cloud data of the vehicle through the LiDAR, obtaining an RGB image of the vehicle through the camera, and obtaining a current speed of the vehicle through the wheel speed sensor;
using the current speed and local path way points associated with the point cloud data to obtain a target angle;
using the current speed and a central lane distance error associated with the RGB image to obtain a compensator angle; and
using the target angle and the compensator angle to obtain a steering command of the vehicle, and steering the vehicle to drive in a lane according to the steering command,
wherein using the current speed and the central lane distance error associated with the RGB image to obtain the compensator angle comprises:
performing a compensator angle calculation operation on the current speed and the central lane distance error to obtain the compensator angle, wherein the compensator angle calculation operation comprises proportional integral derivative control (PID control).

11. The method for steering the vehicle according to claim 10, wherein using the current speed and the local path way points associated with the point cloud data to obtain the target angle comprises:
performing pose estimation on the point cloud data, an HD map, and a start point of the vehicle to obtain a current pose of the vehicle;
performing global path planning on the vector map, the current pose, and the target point of the vehicle to obtain global path way points of the vehicle; and
performing local path planning on the current pose and the global path way points to obtain the local path way points of the vehicle.

12. The method for steering the vehicle according to claim 11, wherein the pose estimation comprises Normal Distributions Transform (NDT).

13. The method for steering the vehicle according to claim 11, wherein the global path planning comprises Trajectory Planning.

14. The method for steering the vehicle according to claim 11, wherein the local path planning comprises Roll-Out Generation.

15. The method for steering the vehicle according to claim 10, wherein using the current speed and the local path way points associated with the point cloud data to obtain the target angle comprises:
performing a target angle calculation operation on the current speed and the local path way points to obtain the target angle, wherein the target angle calculation operation comprises Pure Pursuit.

16. The method for steering the vehicle according to claim 10, wherein using the current speed and the central lane distance error associated with the RGB image to obtain the compensator angle comprises:
performing a lane detection operation on the RGB image to obtain the central lane distance error, wherein the lane detection operation comprises YOLO.

17. The method for steering the vehicle according to claim 10, further comprising:
   obtaining an Around View Monitor (AVM) RGB image of the vehicle through the camera; and
   using the AVM RGB image to perform an accuracy evaluation operation.

18. The method for steering the vehicle according to claim 17, wherein the accuracy evaluation operation comprises an accuracy root mean square error (RMSE) evaluation operation.

* * * * *